United States Patent [19]

Thalström et al.

[11] 4,352,309
[45] Oct. 5, 1982

[54] TRIMMING AND/OR FIN CUTTING TOOLS WITH INTERCHANGEABLE CUTTING EDGES

[75] Inventors: Peeter Thalström, Trångsund; Karl G. Westin, Bromma, both of Sweden

[73] Assignee: AB Westin & Backlund, Stockholm, Sweden

[21] Appl. No.: 156,061

[22] Filed: Jun. 3, 1980

[30] Foreign Application Priority Data

Jun. 8, 1979 [SE] Sweden ............................. 7905030

[51] Int. Cl.$^3$ ............................................. B26D 1/00
[52] U.S. Cl. ...................................... 83/697; 83/622; 83/914
[58] Field of Search ................. 83/697, 914, 690, 622, 83/620, 686, 688; 29/527.6, 33 A; 30/172, 349, 351, 353; 225/97, 103

[56] References Cited

U.S. PATENT DOCUMENTS

| | | | |
|---|---|---|---|
| 3,132,540 | 5/1964 | Boyd | 76/104 R |
| 3,172,327 | 3/1965 | Hazzard | 83/914 |
| 3,555,679 | 1/1971 | Sheridan | 30/172 |

FOREIGN PATENT DOCUMENTS 2848554 5/1979 Fed. Rep. of Germany ........ 83/697

Primary Examiner—Roscoe V. Parker
Attorney, Agent, or Firm—Strimbeck, Davis & Soloway

[57] ABSTRACT

The present disclosure relates to a trimming and/or fin cutting tool for removing ridges, burrs and casting seams of the kind having interchangeable cutting edges, preferably made of hard metal, in which one or more cutting lines of the tool is or are formed by a number of cutting plates (1) detachably mounted on the vertical side (3) of a tool body (2). The tool enables the rational use of the detachable cutting plates and is characterized mainly in that the cutting plates are reversible and are attached to the tool body (2) in a plane directed in the working direction of the tool, the cutting plates having spaces between them to form gaps (6) for the passage of chips. Preferably, the cutting plates along the or each cutting line are attached to the tool body (2) in rows at different heights relative to a base, the separate effective cutting edges of the cutting plates (1) along a common cutting line being arranged to overlap each other.

7 Claims, 3 Drawing Figures

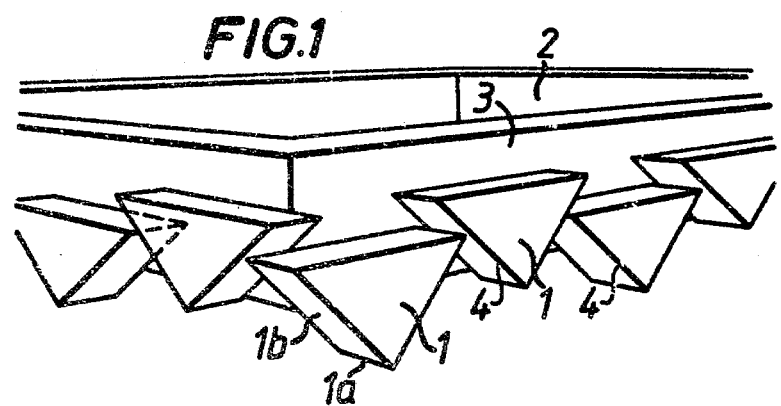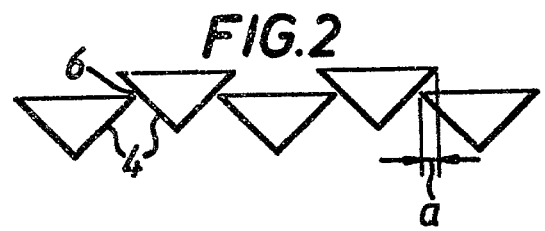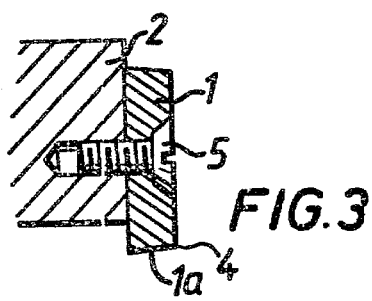

TRIMMING AND/OR FIN CUTTING TOOLS WITH INTERCHANGEABLE CUTTING EDGES

The present invention relates to a method of providing trimming and/or fin cutting tools with interchangeable cutting edges, preferably made of hard metal.

In the field of casting, the cleaning of cast products is an increasingly accentuated problem. Formerly it was, and it still is, a normal practice to chisel and/or machine away ridges, burrs, and so-called casting seams on cast products. By "casting seams" are meant those material accumulations on the products which occur when a casting melt flows out of the mould during a casting process and penetrates into joints at the surface of separation of the like. Removal of ridges, burrs, and similar casting seams by the above-mentioned methods results in the formations of dust and considerable noise. These environmental disadvantages, together with increasing demands on the appearance of the finished cast goods, as well as rising wages in the workshops has resulted in more rational cleaning processes being sought. As an essential part of this search a large number of cleaning machines have been developed and many attempts have also been made to use machines to smooth off the ridges and burrs, on cast products.

In fin cutting or other treatments where material is removed in a machine such as a hydraulic, pneumatic or mechanical press, the most heavily-loaded parts of the tool, that is to say the edges, are generally made of a harder and stronger material which is hard-soldered to a holder or the like means attached to the tool. Therefore, every tool is thus adapted to its particular purpose. As the tool is used the edge is worn away and has to be sharpened. After being sharpened a number of times, the tool is unusable and requires expensive repairwork if the tool is to be fit for use again.

An object of the present invention is to eliminate said disadvantages and to create a system which makes it possible to rationalise the use of detachable cutting plates made of hard metal in trimming and/or fin cutting tools, in which system each separate cutting line of the tool is formed by a number of cutting plates detachably mounted on a tool body.

The invention is characterised mainly in that the cutting plates are reversible, and are attached to the tool body in a plane directed in the working direction, the cutting plates having spaces between them to form gaps for the passage of chips. The invention makes it possible to turn or replace the cutting plates individually when local damage occurs on a composite cutting edge.

In accordance with the invention, the cutting plates along the or each cutting line are attached to the tool body in rows at different heights relative to a base, the separate effective cutting edges of the cutting plates along a common cutting line being arranged to overlap each other.

Preferably, each individual cutting plate is attached to the tool body in a plane such that the cutting angle relative to the horizontal plane is at least 12°.

Other characteristic features of the invention will become apparent from the appended patent claims and from the following description of one preferred embodiment of the invention. The description is made with reference to the accompanying drawing, in which:

FIG. 1 is a perspective view of the system of the invention, which enables the rational use of detachable cutting plates in a trimming and/or fin cutting tool.

FIG. 2 is a side view showing the relative positioning of one line of cutting plates shown in FIG. 1, and, FIG. 3 is a fragmentary sectional view showing how a cutting plate is attached to a tool body.

In the fin cutting tool illustrated in FIG. 1 a number of cutting plates 1 are fitted securely in a tool body 2 so that, as a whole, they enclose a rectangular area and provide four composite cutting lines. Each such cutting line is formed by the co-action of the cutting edges of the plates 1 acting along the said line. Each cutting plate 1 is of triangular shape and is attached to the tool body in a plane directed in the working direction and with one apex 1a foremost. Each cutting plate 1 is, in a conventional manner, shaped with so-called relief angles, which means that one triangular base plane is larger than its other triangular plane because the side surfaces 1b of the plate are formed with so-called reliefs between the said base planes. As will be seen clearly from FIG. 2 the cutting plates 1 are arranged in this embodiment in two rows at different heights relative to the working material. This means that the separate effective cutting edges 4 along a common cutting line are preferably arranged to overlap each other. Thus, the total length of a common cutting line comprises an appropriate number of overlapping cutting plates 1 and it will be appreciated that it is possible to readily adapt the tool to a great extent in dependence upon the particular requirements. By varying the relative height locations of the two rows of cutting plates, it is possible to vary the gaps between the individual cutting plates 1 and, thereby, the total length of a cutting line can also be varied. The overlap a (FIG. 2) which the plates 1 take up relative to each other provides great flexibility for a common cutting line, and this also affords better cutting conditions when carrying out a fin cutting operation. Such a result depends partly on the fact that the total force during the introduction of the fin cutting operation is distributed over a smaller number of contact points, and partly on the fact that each separate cutting edge has a marked inclination relative to the working material which is to be cut.

Referring to FIG. 3, the cutting plates 1 are preferably attached with counter-sunk screws 5 in the usual way, but in certain cases it may also be expedient to provide in the tool body 2 fixed shoulders, stops or the like against which the cutting plates 1 are supported. This facilitates the mounting of the cutting plates 1 and it also means that the fixing screws for the cutting plates 1 are subjected to less stress when cutting operations are being carried out.

The transition into the corner between two cutting lines which meet each other can be formed in a number of different ways without losing the adaptability to different products which is characteristic of the invention.

In the embodiment described above, the individual cutting plates 1 are of the same size and same triangular shape and are attached to the tool body with their planes directed in the working direction of the tool. However, it will be appreciated that within the scope of the invention different sizes and/or shapes of cutting plates may be used in any desired combination, to suit particular requirements. Thus, the cutting plates 1 may equally-well be made four-sided, preferably with a rectangular or square base shape, possibly in different sizes, since this affords many installation possibilities and increases the number of reversible cutting edges available. Between the cutting plates 1, it is also necessary that gaps 6 be provided for the free passage of swarf chips while cutting is being carried out. In this instance, with the embodiment described above, care must be taken to ensure that each actual cutting line is located nearest the tool body 2.

Due to the use of detachable reversible cutting plates 1, a significantly increased working life is achieved for the trimming and fin cutting tools. At the same time it is also possible to achieve significant savings due to the fact that, in the manufacture of a tool in accordance with the invention, it is possible to a large extent to use modular units and fixings. This means that the shapes and dimensions of the cutting plates 1 can be chosen to suit a specific modular system, for example, determined by the number and spacing of fixing holes in the tool body 2 for the cutting plates 1, or to suit cassette-type cutting units which, when fixed to a tool, form together a total cutting edge. In this instance a longitudinal cutting line may have a configuration like that shown in FIG. 2, in which every second cutting plate 1 occupies a raised position between two lower plates. Within the scope of the invention, however, other configurations may also be chosen for the cutting plates 1, and it is also possible to choose other shapes for the detachable cutting plates 1.

The invention is therefore not limited to the embodiment shown by way of example, but can be modified to provide alternative versions within the scope of the following patent claims.

We claim:

1. A trimming/fin cutting tool comprising a tool body, and a number of cutting plates detachably mounted on said tool body and providing effective cutting edges which define at least one cutting line of the tool, wherein the cutting plates are attached to said tool body in a plane directed in the working direction of the tool so as to present cutting edges of "saw tooth" like form along said cutting line, wherein said cutting plates for said cutting line are attached to said tool body in rows at different heights relative to a base so as to define spaces between them for the passage of chips produced during cutting, and wherein the cutting plates at one height are staggered in relation to the cutting plates of another height so that the separate effective cutting edges of the cutting plates overlap each other.

2. A tool according to claim 1, wherein all the cutting plates are of triangular shape and are of the same size, each said cutting plate being attached to the tool body with an apex thereof foremost.

3. A tool according to claim 1, wherein the sizes and shapes of said cutting plates are chosen to conform to a specific modular system for said cutting plates and said tool body respectively.

4. A tool according to claim 2 or 3, wherein the sizes of the cutting plates and the contours of their cutting edges are such that such plates are reversible.

5. A tool according to claim 3, wherein cutting plates of different sizes are used in combination to provide a number of cutting lines which surround an object for fin cutting.

6. A tool according to claim 5, wherein the height position of a number of cutting plates can be adjusted relative to another number of cutting plates so that total length of said cutting line and the spacing between cutting plates along the cutting line can be varied.

7. A tool according to claim 6, wherein each individual cutting plate is attached to the tool body in a plane such that the cutting angle relatively to the horizontal plane is at least 12°.

* * * * *